(12) United States Patent
Smiley

(10) Patent No.: US 7,055,536 B2
(45) Date of Patent: Jun. 6, 2006

(54) SYSTEM AND METHOD FOR CLEANING A FEED DISPENSER

(76) Inventor: Roger Smiley, R.R. 2 Box 115, Rockville, IN (US) 47872

( * ) Notice: Subject to any disclaimer, the term of this patent is extended or adjusted under 35 U.S.C. 154(b) by 572 days.

(21) Appl. No.: 10/436,661

(22) Filed: May 14, 2003

(65) Prior Publication Data

US 2004/0226583 A1  Nov. 18, 2004

(51) Int. Cl.
*B08B 9/00* (2006.01)
*A01K 1/10* (2006.01)

(52) U.S. Cl. .............................. 134/166 C; 134/166 R; 134/167 C; 134/201; 134/22.1; 119/51.01; 119/52.1; 119/53; 119/56.1; 119/174

(58) Field of Classification Search ................ 134/137, 134/166 R, 167 C, 166 C, 201, 22.1, 23, 134/42; 119/51.01, 52.1, 53, 56.1, 174
See application file for complete search history.

(56) References Cited

U.S. PATENT DOCUMENTS

| | | | | |
|---|---|---|---|---|
| 1,937,385 A | * | 11/1933 | Hinkle | 209/235 |
| 2,277,879 A | * | 3/1942 | Ness et al. | 414/323 |
| 2,826,171 A | * | 3/1958 | Piel | 119/52.1 |
| 4,185,587 A | * | 1/1980 | Kallin | 119/51.11 |
| 4,355,598 A | * | 10/1982 | Saylor | 119/52.1 |
| 4,889,078 A | * | 12/1989 | Smiley | 119/53.5 |
| 5,340,211 A | * | 8/1994 | Pratt | 366/141 |

FOREIGN PATENT DOCUMENTS

| | | | |
|---|---|---|---|
| SU | 508457 | * | 5/1976 |
| SU | 1328247 | * | 8/1987 |
| SU | 1472371 | * | 4/1989 |
| SU | 1784557 | * | 12/1992 |

* cited by examiner

Primary Examiner—M. Kornakov
(74) Attorney, Agent, or Firm—Daniel J. O'Connor

(57) ABSTRACT

A cleaning system for a livestock feeding device which unclogs blockage without the need for a workman to enter the feed dispensing area. The system includes at least two swiping arms which are positioned at a lower area of the feed system. The system is environmentally advantageous since workman entry into a hazardous area is reduced. The swiping arms are activated by an external motor which is turned on upon sensing of a clogged or blocked condition of the feed. The system applies to the feeding of hogs, livestock or other dispensing mechanisms.

1 Claim, 1 Drawing Sheet

SYSTEM AND METHOD FOR CLEANING A FEED DISPENSER

BACKGROUND AND OBJECTS OF THE INVENTION

Figure 1:
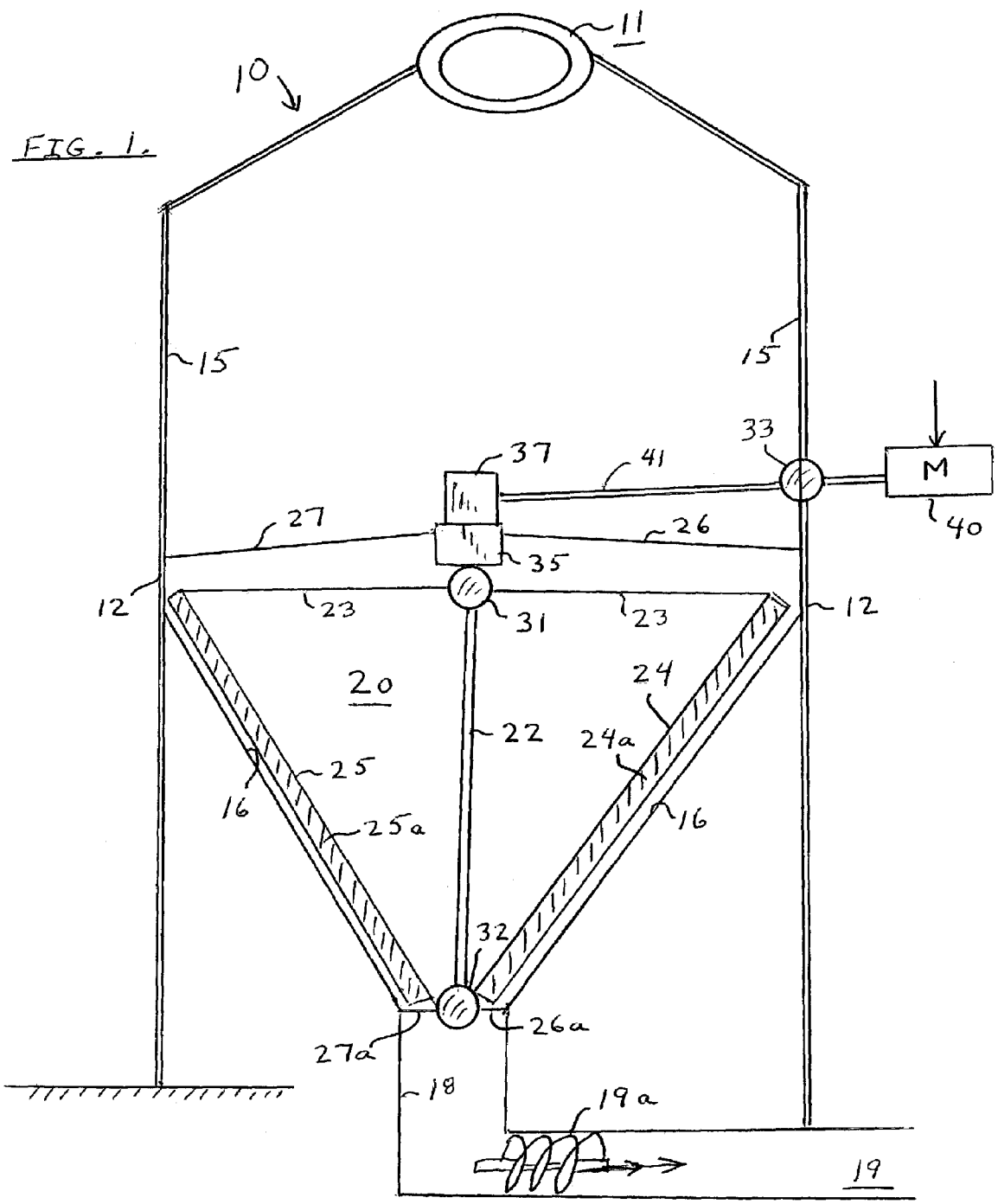

The present invention is generally related to the animal husbandry and feeding arts of U.S. Patent and Trademark Office Class 119.

Various types of livestock feeding systems are utilized to supply granular, liquid, powder or combinations of feed material.

Especially in large-scale operations, it is critical that the feed dispenser not be subject to prolonged blockage.

The large supply bins utilized are often difficult to unclog without doing damage to the bin, dispenser section and the overall supply system.

Accordingly, it is an object of the present invention to set forth a novel cleaning system and method of use for efficiently unblocking a feed bin and dispenser. The invention has use for a large-scale operation comprising multiple bins and for smaller operations as well.

It is a further object of the invention to describe a cleaning system which is readily installed within a dispenser/bin combination on a permanent basis so that a workman/engineer need not enter the bin for the purpose of removing blocking materials.

It is a still further object to show a system and method which reduces damage to the bin and dispenser to provide for a longer useful life of the overall system.

It is also an object of the invention to demonstrate a cleaning system which is economically manufactured and installed for widespread commercial use and appeal in the livestock feeding arts.

The broader principles described herein have use in combination with various dispenser systems other than in the animal feeding arts.

PRIOR ART PATENTS AND DESIGNS

During the course of preparing this specification for submission to the U.S. Patent Office, a full search of the relevant arts was conducted.

Such included the animal husbandry and feeding arts of Class 119 and the broader dispensing arts of U.S. Class 222.

U.S. Pat. Nos. 4,185,587, 5,340,211 and 4,355,598 are examples of large-scale feeding operations which are currently used in the art.

The presently described system and method of use sets forth new and useful features which have not previously been shown in the prior art. Accordingly, the design shown is believed to be clearly patentable under the laws of the United States.

SUMMARY OF THE INVENTION

A rotating element comprising at least two swiping arms is placed in a lower part of a feed bin in the area of a conical dispenser.

The arms are sized and positioned so as to be able to clean the dispenser section when needed.

The cleaning arms are supported by means of a central rotating shaft which is turned at a low RPM via a motor and gear-box combination.

Horizontal support arms are also included in the cleaning device.

Bearing elements for the central rotating shaft are supported by bar elements extending from the sides of the bin-dispenser combination.

Replaceable rubber strips are mounted on the cleaning arms so that no damaging metal-to-metal contact occurs during the cleaning process. The rubber strips may be attached by bolts, clamps or other equivalent mechanical means.

BRIEF DESCRIPTION OF THE DRAWING FIGURE

FIG. 1 is a side schematic view of the cleaning and declogging device in a preferred position within a bin-dispenser assembly. In large-scale operations, multiple bins and dispensers would be utilized.

FULL DESCRIPTION OF A PREFERRED EMBODIMENT

Referring to the drawing FIG. 1, a large bin 10 is shown as having an upper entry port 11 by which feed is introduced into the system. Bin 10 includes a lower portion 12 which has a conical dispensing section placed therein as indicated at walls 16. Bin includes walls 15.

A cleaning or swiping element 20 is placed in a lower part of the bin 10.

Cleaning element 20 includes a central rotatable shaft 22 with at least two horizontal support arms 23 extending therefrom.

The cleaning element 20 further includes cleaning or wiping arms 24 and 25. A rubber or equivalent strip material is attached to the wiping arms as shown at 24a and 25a. The replaceable rubber avoids any metal-to-metal contact when the cleaning device is rotated to remove any blockage or clogging from the lower bin areas shown at numerals 16.

The cleaning element 20 is supported in its rotatable position by means of bearings 31 and 32. The upper bearing 31 is supported in place via a platform 35 which is in turn supported by bar elements 26 and 27 extending from the sides of the bin. Lower bar elements 26a and 27a support the lower bearing 32.

As will be appreciated, shaft 22 is turned via an exterior motor 40 which acts through a gear box 37 to turn the shaft and the cleaning arms at a speed of about 5 RPM when needed.

Motor 40 may be controlled and operated by a workman/engineer from outside the bin 10 when a blocked or clogged condition is discovered. Thus, the operator does not have to enter the inside bin area to remove a blocked condition.

As further shown in FIG. 1, a lower drop chute 18 supplies a feed compound to an exit area 19 by means of an auger or pump element 19a.

Numeral 41 shows the shaft extending to the gear-box 37 from an outside bin location to provide a safety and efficiency factor.

For health and safety reasons, the bin area may be surrounded by a wall. Under present federal and state regulations, a workman/engineer must shower before entering and after exiting the feed bin area.

Thus, the need for a remotely operated cleaning system and method will be readily appreciated.

In current practice, when a clogging condition occurs, a workman must enter the bin area and literally bang on the walls 16 and 18 to attempt to dislodge any clogged materials.

This practice can be damaging to the walls 16 and 18 and thus reduce the life of the overall bin construction.

The remote operation of the gear box and shaft 22 is achieved by a wall-mounted bearing 33.

While a particular embodiment and advantageous operation have been shown, it is intended in this specification to broadly cover all equivalent structures and methods of use.

For example, the dimensions of cleaning element 20 will vary depending upon the overall size of the bin 10. For a large-scale operation, a series of variously sized bins would be utilized with each having an appropriately sized cleaning element.

The invention is further defined by the claims appended hereto.

I claim:

1. A system for cleaning a feed dispenser or bin(10) wherein said bin includes an upper entry port(11), the system including a cleaning means(20) for dislodging and unblocking clogged feed materials, wherein said cleaning means(20) is driven by a gearbox(37) placed within the bin and a motor(40) located outside the bin, said cleaning means comprising a central rotary shaft(22) and at least two lateral swiping arms(24,25) which are connected to the central rotary shaft(22) by means of at least two horizontal arms(23), wherein said swiping arms(24,25) have rubber strips(24*a*, 25*a*) attached thereto to avoid metal-to-metal contact during the cleaning operation, said cleaning means(20) further including upper and lower support bearings(31, 32), wherein said lower bearing(32) is connected to a dispensing section(16) by means of lower bar elements(26*a*, 27*a*), wherein said system further includes a platform(35) mounted to the bin(10) by two bar elements (26,27) mounted about halfway up the inner walls of said bin, wherein said platform(35) has a bearing(31) mounted to a lower side thereof and an element comprising a gearbox(37) mounted to an upper side thereof, said motor(40) being positioned at a lateral outside position and about halfway up the wall of said bin, said motor being connected to the gearbox(37) by means of a bearing(33) placed in a wall of said bin and a shaft(41) extending between said bearing and said gearbox(37), wherein the area in said bin(10) which is above the platform(35) and gearbox(37) is devoid of any shaft or other elements so that a smooth flow of materials is effected in the upper regions of said bin(10).

* * * * *